Nov. 14, 1939.　　　E. R. MAURER　　　2,179,945
CLUTCH
Filed Jan. 18, 1934　　　2 Sheets-Sheet 1

INVENTOR.
EDWIN R. MAURER
BY
Harness, Dind, Patee & Harris
ATTORNEYS

Nov. 14, 1939.　　　E. R. MAURER　　　2,179,945
CLUTCH
Filed Jan. 18, 1934　　　2 Sheets-Sheet 2
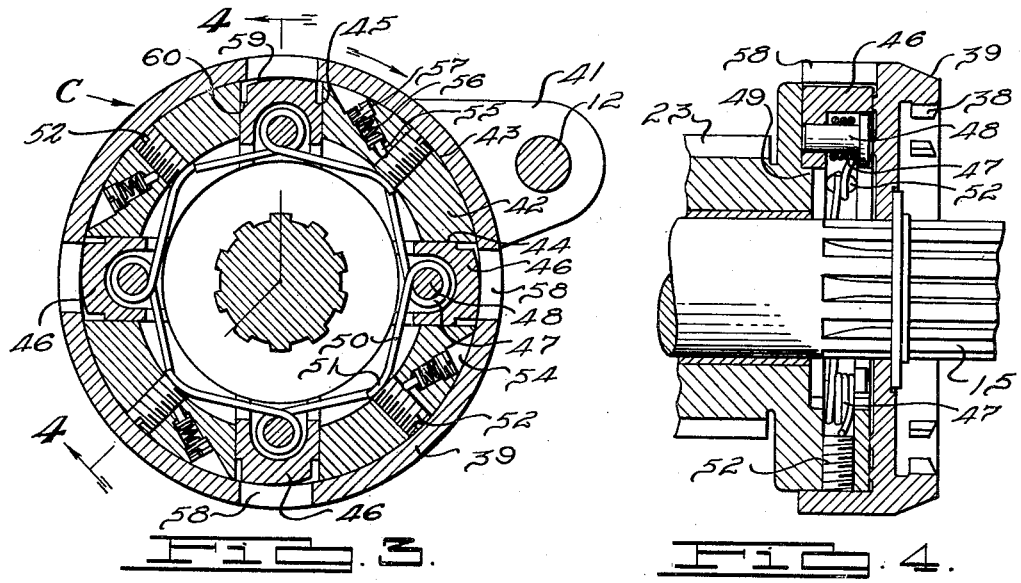
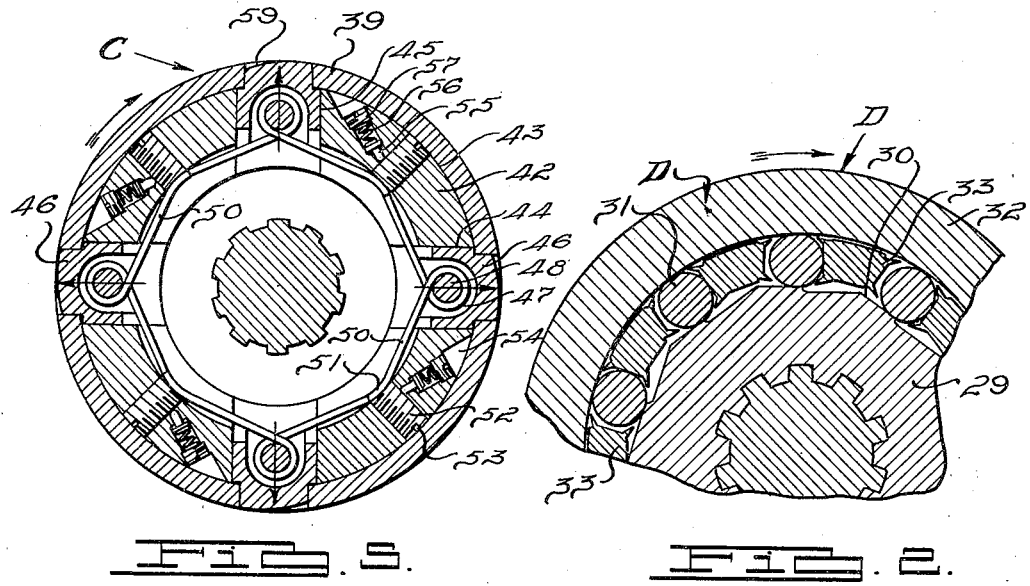
INVENTOR.
EDWIN R. MAURER
BY
Harness, Lind, Patee & Harris
ATTORNEYS Patented Nov. 14, 1939

2,179,945

UNITED STATES PATENT OFFICE 2,179,945

CLUTCH

Edwin R. Maurer, Detroit, Mich., assignor to Chrysler Corporation, Detroit, Mich., a corporation of Delaware Application January 18, 1934, Serial No. 707,091

28 Claims. (Cl. 192—105)

This invention relates to clutches and refers more particularly to clutches of the type providing automatic engagement of relatively driven members.

It is an object of my invention to provide an improved clutch which will automatically connect parts in a driving mechanism and which will automatically release the connected parts under predetermined desired conditions of relative speeds of such parts.

A further object of my invention resides in the provision of an improved clutch having one or more pawls, dogs, or clutching members adapted to move into clutch engaging or disengaging positions in response to centrifugal forces acting on the pawls.

An additional object of my invention resides in the provision of improved means, preferably in the form of one or more springs, for yieldingly resisting and controlling the action of centrifugal forces on the pawl or pawls. One important characteristic of my invention consists in providing means for conveniently adjusting the force exerted by the spring means on the pawls. In this manner the characteristics of the action of any pawl may be readily varied.

In carrying out the objects of my invention I preferably provide a cage or core adapted to carry a plurality of pawls, and a sleeve or shell provided with suitable slots or openings respectively adapted to receive the pawls under the desired conditions of clutching action. I have provided means for adjusting the spring forces acting on the pawls, such adjustment being accomplished without dismantling the clutch assembly.

My improved clutch is particularly adapted for use in driving mechanisms for motor cars or vehicles, where it is desired to vary the driving speed ratio between the vehicle engine or prime mover and the propelling ground wheels. Thus, my invention may be used to advantage in transmissions and other driving mechanisms for effecting automatic changes in the driving speed ratio, the cage being driven by either the engine or the vehicle ground wheels and the shell by the other. Thus, by relatively driving the clutch members by the engine and car, the action of my clutch is responsive to conditions of car speed so as to automatically vary the driving speed ratio under desired conditions. Other uses of my clutch will be apparent from the teachings of my invention.

A still further object of my invention resides in the provision of spring means acting on the clutch pawls, according to one feature of my invention, in such a manner that the pawls are substantially balanced as to the opposing forces exerted thereon by the rate of the spring means and the centrifugal force acting at the speed of rotation of the pawl cage where engagement of the clutch is desired. This predetermined desired speed may be termed the critical speed and by providing the aforesaid balance, I am enabled to cause the pawls to advance and retract over a relatively small speed differential, the differential being occasioned largely by reason of a certain amount of static frictional resistance to movement of the pawls. When this static friction is overcome, the pawls quickly engage or disengage as the case may be, according to other conditions which will be hereinafter more apparent.

Further objects and advantages of my invention reside in the novel combination and arrangement of parts more particularly hereinafter described and claimed, reference being had to the accompanying drawings in which:

Fig. 2 is an enlarged sectional view through line 2—2 of Fig. 1 showing a portion of the free wheeling or overrunning clutch.

Fig. 3 is an enlarged sectional view through line 3—3 of Fig. 1 showing my improved clutch.

Fig. 4 is a sectional view through the clutch shown in Fig. 3, the section being taken along line 4—4 thereof.

Fig. 5 is a view of my clutch similar to that shown in Fig. 3 but showing the clutch pawls extended into clutch engaging position.

Figure 1:
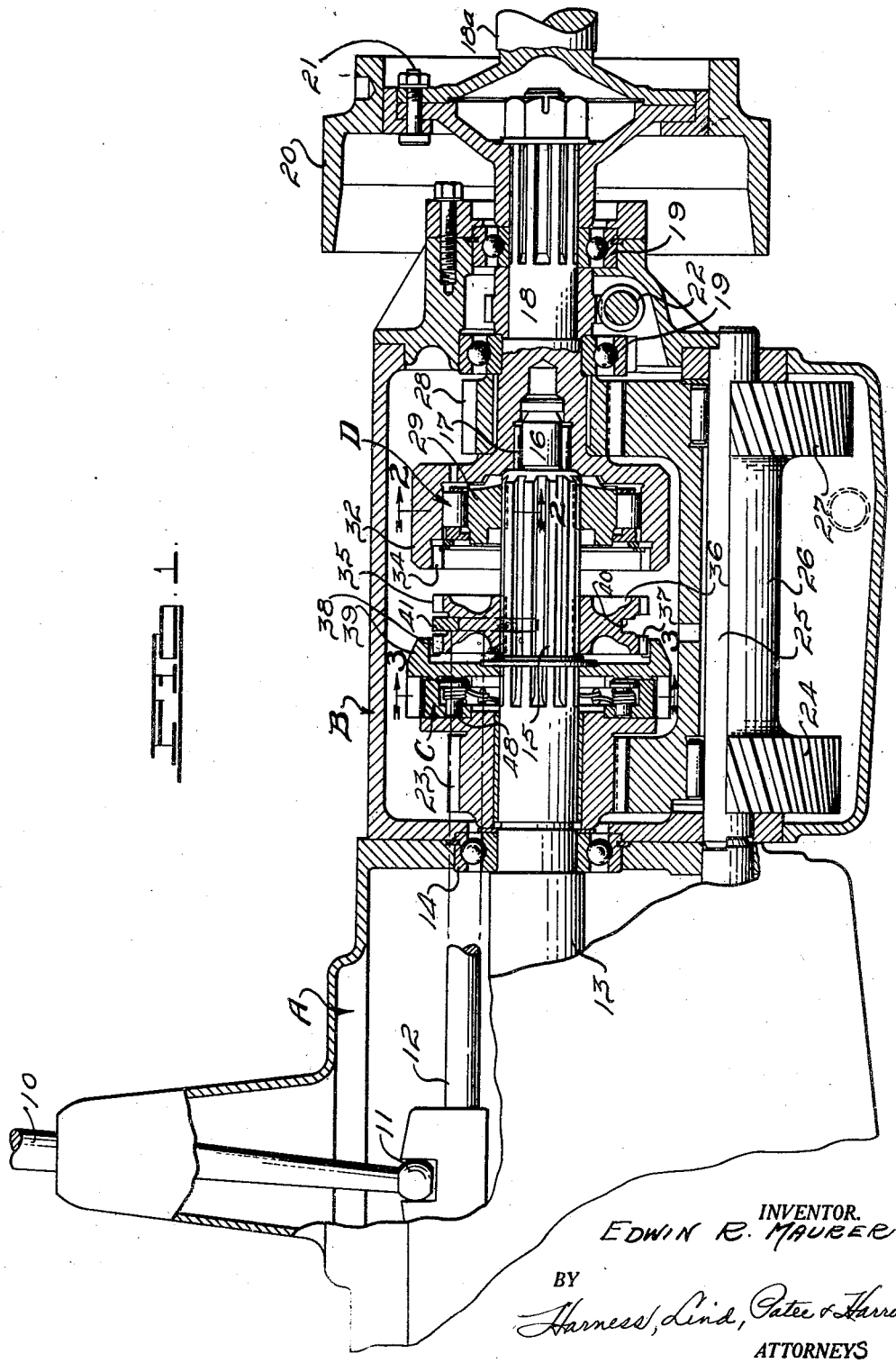
Fig. 1 is a cross-sectional elevational view through the power transmission mechanism illustrating my clutch as a part thereof.

In the drawings, I have illustrated my clutch in a power transmitting mechanism for a motor vehicle, such mechanism including the transmission A and the auxiliary transmission or overdrive mechanism B at the rear end thereof.

The transmission A may be of any suitable type such as the conventional selector type operated by the well-known shifter lever 10, the operating end 11 of which is illustrated in Fig. 1 in engagement with the reverse selector 12 ready to move this selector to the right for effecting the usual reverse drive through the transmission. The purpose of such arrangement will be presently apparent. The usual motor vehicle engine or prime mover (not shown) is adapted to transmit power in the customary manner, for example, through transmission A, the power being taken off by a drive shaft 13 rotatably supported in bearings, one of which is illustrated at 14.

Shaft 13 extends rearwardly into the over drive mechanism B and is splined at 15 adjacent the end 16 thereof which is centered by bearing 17 in the forwardly extending end of driven shaft 18, 18ᵃ. This driven shaft is mounted in suitable bearings 19 and extends rearwardly for driving the rear vehicle wheels (not shown) in the customary manner. If desired, the usual propeller shaft brake drum 20 may be mounted by a series of fasteners 21 in fixed relation with shaft 18, the shaft portions 18, 18ᵃ being thereby connected as a unit. If desired, the usual speedometer drive may be taken from shaft 18 by reason of the gearing illustrated at 22.

Freely mounted on shaft 13 at the front end of the overdrive mechanism B, is a gear 23 driven by a gear 24 rotatable on a fixed countershaft 25 and having an integral sleeve 26 formed with a gear 27. The latter gear is driven by gear 28 keyed to shaft 18, the countershaft gearing 28, 27, 24, and 23 being thereby adapted to at all times drive the automatic clutch C from and with the driven shaft 18. This countershaft gear train determines the overdrive ratio as will be presently apparent, and when shaft 13 is directly driving the shaft 18 through the overrunning clutch or free wheeling clutch D, the automatic clutch C will be driven at a slower speed than that of the drive shaft 13, it being understood that, in such instance, clutch C is not in clutching position.

The free wheeling clutch D, best shown in Fig. 2, may be of any suitable form, the illustration showing a conventional device in which the inner cam member 29 is driven by the splines 15 of shaft 13, the cam faces 30 being engaged by cylinders or rollers 31 so that for the driving rotation of shaft 13 (clockwise as viewed in Fig. 2) the high sides of cam faces 30 will wedge the cylinders 31 between cam member 29 and the outer driven free wheeling member or pineapple 32 to establish a direct drive thereto. The usual spacer 33 maintains the cylinders in spaced position, it being apparent that whenever the engine slows down, the vehicle may, by reason of clutch D, overrun shaft 13, other conditions permitting such action as will be presently apparent. As shown in Fig. 1 the driven member 32 may be formed as an extension of shaft 18 or otherwise connected thereto in driving relation.

The driven free wheeling member 32 is formed with internal jaws or teeth 34 adapted to be engaged and locked with corresponding jaws or teeth 35 of a control or clutch sleeve 36 having splined engagement with splines 15. This sleeve has a second set of jaws or teeth 37 shown, in Fig. 1, in engagement with corresponding teeth internally formed at 38 on the pawl receiving structure or shell 39 of clutch C, this shell being centered by shaft 13 but freely rotatable with respect thereto except when coupled therewith by reason of sleeve 36 as shown in Fig. 1.

Sleeve 36 has an annular groove 40 adapted to receive the shifter element 41 carried by the rear end of the reverse selector 12 so that when the shift lever 10 is actuated to move selector 12 to establish a reverse drive of shaft 13, as in reversing the motor vehicle, the sleeve 36 is thereby moved along splines 15 to disengage teeth 37 and 38 and thereafter engage teeth 34 and 35 in order to lock out the free wheel clutch D. It will be understood that I have omitted the details of the gearing of transmission A as such parts are well-known in the art and require no disclosure in detail.

Referring now to my automatic clutch C, best shown in Figs. 3 to 5, the gear 23 is provided with a pawl carrying structure comprising the diametrically arranged lateral extensions or pawl guides 42, these extensions having arcuate faces 43 fitting within shell 39. Extensions 42 have pawl engaging faces or walls 44 and 45. Fitting within shell 39 are the pawls 46, each having a face in sliding engagement with the faces 44 and 45 of adjacent extensions 42 and each having a recess 47 into which a pin 48 projects as shown in Fig. 4. It will therefore be apparent that the pawl carrying structure is formed with a plurality of outwardly opening circumferentially spaced slideways or guideways each defined by a pair of the adjacent relatively circumferentially spaced walls 44 and 45 for slidably guiding movement of a pawl 46. The pawls are limited in their inward movement by abutments 49 which extend laterally from gear 23 between adjacent extensions 42.

In order to normally urge the pawls inwardly of the pawl cage to position the parts as shown in Fig. 3, I have provided springs 50, each spring preferably being coiled a number of times around its pin 48 and extending therefrom in generally opposite directions within adjacent extensions 42, each spring having terminal portions 51 acting on the adjustable abutments 52 threaded into extensions 42, these threaded members 52 having tool receiving slots 53 permitting their ready adjustment to vary the spring tension as will be presently apparent. Each spring 50 thus extends generally circumferentially from a pawl 46 in a direction generally transverse to the movement of the pawl. The abutments 52 are carried as parts of the pawl carrying structure and are spaced circumferentially from their associated pawls 46 thereby accommodating springs 50 of sufficient length so that the desired characteristics control on the pawls may be provided.

The extensions 42 have further openings 54 directed toward abutments 52 respectively, these openings each receiving a detent 55 urged by a spring 56 into locking engagement with an abutment 52, each spring abutting an adjustable threaded member 57.

The shell 39 has a plurality of circumferentially spaced pawl receiving slots or openings 58 suitably arranged so that diametrically arranged pairs of slots will simultaneously register with the pawls 46 so as to receive said pawls under conditions hereinafter more apparent.

It will be noted that the springs 50 may be readily adjusted from without the clutch by aligning each of the threaded members 57 with a slot 58 for releasing detents 55 after which abutments 52 may be rotated to effect the desired adjustment in the tension of the springs governing the action of the pawls. Thereafter, the detents 55 may be restored to their locking positions.

The outer ends of pawls 46 are preferably provided with cam faces 59 acting on the inner edges of slots 58 to progressively release the pawls outwardly when the clutch shell and cage are rotating substantially together at a predetermined speed. When pawls 46 move outwardly in slots 58, such movement is limited by engagement of pawl shoulders 60 with the portions of shell 39 adjacent slots 58 as shown in Fig. 5.

In operation of the power transmitting mechanism, with the parts positioned as in Fig. 1, the engine will drive shaft 13 and hence the driven shaft 18, 18ᵃ to drive the vehicle forwardly in direct drive so far as the driving and driven shafts 13 and 18 respectively are concerned. This direct drive takes place from shaft 13, through the free wheel clutch D and thence to driven shaft 18. When the vehicle tends to overrun the engine, such action may take place by reason of clutch D. During this direct drive the shell 39 will be driven by sleeve 36 at the speed of shaft 13 while the pawls will be rotated by gear 23 at a speed less than that of the driven shaft 18 by reason of the reduction through the countershaft gears 24 and 27.

By way of illustrating one manner of operation of my automatic clutch C, this clutch is illustrated as being adapted to automatically lock out or to render the free wheel clutch D ineffective and to simultaneouslly drivingly connect sleeve 39 with gear 23 at a predetermined speed of rotation of shaft 18 and hence a predetermined speed of vehicle travel. When such clutching action takes place, the shaft 18 is driven from gear 23 as aforesaid and hence through the countershaft gear train to the shaft 18, such drive providing an overdrive or a higher speed of the driven shaft 18 than that of the driving shaft 13.

An overdrive is ordinarily desirable at only relatively high speeds of vehicle travel and hence, by a suitable setting of the pawl springs 50, the pawls may be held inoperative against the influence of centrifugal forces acting to move the pawls outwardly, until the desired predetermined critical speed has been reached. Assuming, by way of example, that such automatic overdrive is desired at approximately 50 miles per hour of vehicle travel, then, when the vehicle is being driven at this speed, the pawls are urged outwardly by centrifugal force to engage slots 58 of shell 39 when rotation of the pawl cage and shell become substantially uniform. Under the assumed conditions, springs 54 may be set so that the pawls tend to fly outwardly at a speed of shaft 18 corresponding to 50 miles per hour of vehicle travel, the pawls being restrained from moving outwardly, until the clutch parts are synchronized, by reason of the gear reduction which drives the pawls at a slower speed than that of slots 58 which are driven directly from the drive shaft 13. Owing to the difference in rotational speeds of the slots and pawls, these parts pass each other with such rapidity that the pawls do not have time to move outwardly to engage the slots and the parts continue to slip until the operator momentarily releases or diminishes the power of the engine applied to shaft 13 so as to permit the shell 39 to decelerate. In decelerating, the shell 39 obviously very quickly drops to the speed of the pawl cage, momentarily synchronizing the pawls with a pair of diametrically arranged slots, the pawls thereupon being guided out, during rotation thereof, by cam faces 59 for effecting initial engagement of the pawls in the slots. Once engaged, the centrifugal force acting on the pawls carries them outwardly for fully engaging the slots of shell 39 and the overdrive immediately takes place with the free wheel clutch D locked out as aforesaid.

As long as the engine drives the vehicle at or above the aforesaid overdrive speed, with the pawls 46 engaged in slots 58, the clutch C will remain engaged. However, when the vehicle slows down below the aforesaid 50 miles per hour, in the assumed illustration, the pawls 46 will be urged to their retracted or normal position of Fig. 3, such retraction taking place just as soon as the friction of the drive is relieved or reversed between the sides of the slots and pawls. Thus when the vehicle driver momentarily releases the usual accelerator pedal to cause the vehicle to drive the engine, this reversal of drive permits retraction of the pawls and the power transmission is then again operating without the overdrive and through the free wheeling clutch D.

When it is desired to drive the vehicle in reverse, shifter 12 is moved to actuate sleeve 36 to the right, as viewed in Fig. 1, so as to disengage teeth 37 and 38 and to engage teeth 34 and 35 to lock out the free wheel clutch D. This reverse drive thus passes from shaft 13 to sleeve 36, driven member 32 and thence to the driven shaft 18, it being understood that shaft 13 has its rotation reversed by the usual reversing mechanism of transmission A.

In Fig. 5, I have illustrated the positions of the pawls 46 when the automatic clutch C is in the clutching position for operating the overdrive.

I desire to point out that instead of driving the slot carrying sleeve directly from the drive shaft 13 and hence from the engine, and the pawl cage from the driven shaft 18, such parts may be readily reversed if desired so as to drive the pawl cage directly from the engine and the slots from the vehicle or driven shaft 18. The illustrated arrangement is preferred, however, where my automatic clutch is used in an overdrive mechanism, since the engine continues to drive at the overdrive speed from the time when the pawls are engaged in the pawl slots, viz., at a speed slower than in direct drive for the same vehicle speed. With the suggested reversal of clutch parts, the engine would have to operate considerably faster, by the overdrive ratio, than the driven shaft to speed up the slot carrying member and then by slowing down the engine momentarily to reduce the speed of the pawl cage to that of the slot carrying member, the pawls will engage the slots. In such instance, it is, therefore, apparent that the engine would have to drive at a speed greater than its speed for the overdrive setting of the pawls in order to establish the proper conditions for effecting actuation of the automatic clutch C.

While I have illustrated my clutch in connection with an overdrive mechanism for motor vehicles, I desire to point out that this is but one useful application or use of my clutch. My improved clutch may be used to advantage wherever a clutching action between two rotatable parts is desired, particularly where such action is to be automatically responsive to desired conditions of relative rotatable speeds of the two members to be clutched or declutched.

While I do not limit my invention, in its broader aspects, to any particular relationship of spring forces and centrifugal forces acting on the pawls, I have discovered that improved performance in automatic clutches of the character referred to herein, may be obtained by providing a substantially balanced or floating pawl at the speed of rotation of the pawl cage where clutching action is desired. It is well known that the rate of a spring is the change in the spring load accompanying or caused by a unit change in the spring deflection. Thus, I prefer to arrange the spring rate so that at the critical speed of clutch engagement, the centrifugal force acting on any pawl will be substantially counterbalanced by the pull of the pawl spring so that the pawl can readily move outwardly into clutching position. At the end of the outward pawl movement, the increased centrifugal force due to the outward displacement of the center of gravity of any pawl is preferably also substantially counterbalanced by the inward pull of the spring associated therewith. Centrifugal force is proportional to the distance of the center of gravity of a rotating mass from its axis, and the increase of the center of gravity distance is counterbalanced by an increase of the spring load occasioned by the pawl movement. The spring rate is thus one which balances the increase in centrifugal force during outward pawl movement.

By providing relatively high rate springs acting in opposition to the centrifugal force, I am enabled to counterbalance the progressively increasing centrifugal force as the pawls progressively move outwardly during their clutching action at the critical speed of rotation of the pawl cage and slot carrying shell. In actual practice, in applying my invention to various drives, this spring rate is very desirable in providing a narrow range of speed variation for the clutching and non-clutching actions of the pawls.

Thus, where the pawls are substantially balanced as aforesaid, the clutching action will take place substantially at the minimum or critical speed of rotation of the pawl cage sufficient to cause the centrifugal force to overcome the friction to pawl movement and to just overbalance the opposing springs; the declutching movement of the pawls taking place at a speed of rotation of the pawl cage close to that of the critical speed although the friction in such instance will be somewhat greater since the drive is through the pawls (unless relieved by the vehicle driver releasing the accelerator pedal). If a relatively low spring rate were employed for the pawls, the centrifugal force would build up much faster than the increase in spring opposition as the pawls moved outwardly, and the clutch releasing operation would take place at an undesirable speed considerably below the critical speed of clutch engagement. This would be further accentuated by the friction inherently opposing initial movement of the pawls. By reason of my invention I have provided a clutch mechanism which engages and disengages within narrow ranges of vehicle speed changes, even as low as one mile per hour although in many instances a somewhat wider range of clutch operation is desirable. Obviously, at relatively low vehicle speeds there is less latitude for a wider range of clutch operation than at higher speeds. Even where relatively wide ranges of clutch operation are desirable, my balanced pawl operation has advantages in obtaining quick movements of the pawls since they are readily susceptible for movement in response to variation in the rotational speed of the pawl cage when the speed of rotation of the pawl cage is varied to pass through the critical speed either on increasing or decreasing rotational speeds.

Furthermore, I do not limit my invention, in the broader aspects thereof, to the particular combination and arrangement of parts shown and described for illustrative purposes, since various modifications will be apparent within the teachings of my invention as defined in the appended claims.

What I claim is:

1. In a clutch for drivingly connecting driving and driven members, a pawl carrying structure drivingly connected to one of said members, a pawl carried by the pawl carrying structure and adapted for centrifugal force movement in response to a predetermined speed of rotation of the pawl carrying structure, a pawl-receiving structure drivingly connected to the other of said members and adapted to receive said pawl to provide a positive driving connection between said structures, a spring engaging said pawl and having end portions extending generally in opposite directions therefrom circumferentially of said pawl carrying structure, and means for adjusting one of said end portions.

2. In a centrifugal clutch, a cage provided with a centrifugally actuated pawl, pawl guiding means for said pawl, an abutment spaced circumferentially of the cage from said guiding means, a pawl retracting spring intermediate said pawl and said abutment, and means for adjusting said abutment to vary the characteristics of said spring.

3. In a centrifugal clutch, a cage provided with a centrifugally actuated pawl, pawl guiding means for said pawl, an abutment spaced circumferentially of the cage from said guiding means, a pawl retracting spring intermediate said pawl and said abutment, and means for adjusting said abutment to vary the characteristics of said spring, said adjusting means extending outwardly of said cage for manipulation from the exterior thereof.

4. In a clutch for drivingly connecting driving and driven coaxial rotatable members, a pawl carrying structure fixed against radial displacement and drivingly connected to one of said members for rotation about the common axis of rotation of said members, a pawl receiving structure drivingly connected to the other of said members for rotation about said axis, said pawl carrying structure having a slideway formed with circumferentially spaced walls extending in a direction outwardly from said axis toward said pawl receiving structure, a pawl carried by said pawl carrying structure and having a clutching portion disposed to one side of said axis for outward sliding movement in said guideway, said pawl clutching portion having at least one side face thereof in sliding engagement with an outwardly extending wall of said slideway, said pawl clutching portion being adapted for clutching movement by centrifugal force exerted thereon in response to rotation of said pawl carrying structure substantially at or above a predetermined critical speed of rotation of said pawl carrying structure, means carried by said pawl receiving structure for receiving said pawl clutching portion to drivingly connect said members when said structures are free from driving connection therebetween and are operated at substantially the same speed of rotation, and yielding means acting on said pawl in opposition to said centrifugal force, at least a portion of said yielding means being disposed at a point spaced circumferentially of said pawl clutching portion outside of the space between the walls of said guideway, said yielding means being constructed and arranged to substantially balance the centrifugal force acting on said pawl at successive positions in the clutching movement of said pawl clutching portion at said critical speed of rotation of said structures.

5. In a clutch for drivingly connecting driving and driven coaxial rotatable members, a pawl carrying structure fixed against radial displacement and drivingly connected to one of said members for rotation about the common axis of rotation of said members, a pawl receiving structure drivingly connected to the other of said members for rotation about said axis, said pawl carrying structure having a slideway formed with circumferentially spaced walls extending in a direction outwardly from said axis toward said pawl receiving structure, a pawl carried by said pawl carrying structure and having a clutching portion disposed to one side of said axis for outward sliding movement in said guideway, said pawl clutching portion having at least one side face thereof in sliding engagement with an outwardly extending wall of said slideway, said pawl clutching portion being adapted for clutching movement by centrifugal force exerted thereon in response to rotation of said pawl carrying structure substantially at or above a predetermined critical speed of rotation of said pawl carrying structure, means carried by said pawl receiving structure for receiving said pawl clutching portion to drivingly connect said members when said structures are free from driving connection and are operated at substantially the same speed of rotation, and a spring acting on said pawl in opposition to said centrifugal force, at least a portion of said spring being disposed at a point spaced circumferentially of said pawl clutching portion outside of the space between the walls of said guideway, said spring being constructed and arranged to progressively increase the opposing force thereof substantially in direct proportion to the progressively increasing centrifugal force acting on said pawl at successive positions in the clutching movement of said pawl clutching portion at said critical speed of rotation of said structures.

6. In a clutch for drivingly connecting driving and driven coaxial rotatable members, a pawl carrying structure fixed against radial displacement and drivingly connected to one of said members, a pawl receiving structure drivingly connected to the other of said members, a pawl carried by said pawl carrying structure and having a clutching portion adapted for clutching movement by centrifugal force exerted thereon in response to rotation of said pawl carrying structure, said pawl carrying structure having a guideway extending outwardly from said common axis of rotation for slidably receiving said pawl clutching portion, said guideway having circumferentially spaced walls at least one of which is slidably engaged by said pawl clutching portion, means carried by said pawl receiving structure for receiving said pawl clutching portion to drivingly connect said members when said structures are free from driving connection and are operated at substantially the same speed of rotation, and means including a spring acting on said pawl in opposition to said centrifugal force, said spring being disposed for yielding action between said pawl and an abutment rotatable with said pawl carrying structure, said spring abutment being disposed at a point spaced circumferentially from said pawl clutching portion outside of the space between the walls of said guideway, said spring being constructed and arranged to progressively increase its opposing force substantially in direct proportion to the progressively increasing centrifugal force acting on said pawl at successive positions in the clutching movement of said pawl at the minimum speed of rotation of said pawl clutching portion carrying structure sufficient to cause said pawl clutching movement.

7. In a centrifugally operated clutch, a rotatable shell formed with a plurality of pawl receiving slots, a rotatable cage fixed against radial movement and provided with a plurality of pawls each having a clutching portion actuated by centrifugal force exerted thereon substantially at or above a predetermined critical speed of rotation of said cage for engagement with one of said slots when said shell and cage are rotated free from driving connection therebetween at substantially the same speed, said cage being provided with a plurality of substantially diametrically opposite guideway means respectively accommodating said pawl clutching portions, and means constructed and arranged to substantially counterbalance the centrifugal force acting on said pawls at successive positions in the clutching movements thereof at said critical speed of rotation of said shell and cage, said counterbalancing means including springs respectively acting on said pawls, and an abutment for each of said springs disposed circumferentially intermediate said guideways.

8. In a centrifugally operated clutch, a rotatable shell formed with a plurality of pawl receiving slots, a rotatable cage fixed against radial movement and provided with a plurality of pawls actuated by centrifugal force exerted thereon for causing said pawls to engage said slots when said shell and cage are rotated free from driving connection therebetween at substantially the same speed, yielding means constructed and arranged to substantially counterbalance the centrifugal force acting on said pawls at successive positions in the clutching movement of said pawls at the minimum speed of rotation of said cage sufficient to cause said pawl clutching movement, and adjustable means acting on said yielding means for varying the clutching characteristics of said pawls, said adjustable means being accessible for actuation exteriorly of said cage.

9. In a centrifugally operated clutch, a rotatable shell formed with a plurality of pawl receiving slots, a rotatable cage fixed against radial movement and provided with a plurality of pawls actuated by centrifugal force exerted thereon for causing said pawls to engage said slots when said shell and cage are rotated free from driving connection therebetween at substantially the same speed, yielding means constructed and arranged to substantially counterbalance the centrifugal force acting on said pawls at successive positions in the clutching movement of said pawls at the minimum speed of rotation of said cage sufficient to cause said pawl clutching movement, and adjustable means acting on said yielding means for varying the clutching characteristics of said pawls, said adjustable means being registered with one of said slots during relative rotation of said shell and cage.

10. In a centrifugally operated clutch, a rotatable shell formed with a plurality of pawl receiving slots, a rotatable cage provided with a plurality of pawls actuated by centrifugal force exerted thereon for causing said pawls to engage said slots when said shell and cage are rotated at substantially the same speed, yielding means constructed and arranged to substantially counterbalance the centrifugal force acting on said pawls at successive positions in the clutching movement of said pawls at the minimum speed of rotation of said cage sufficient to cause said pawl clutching movement, said yielding means extending generally laterally from said pawls, and abutment means for said yielding means intermediate adjacent pawls.

11. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, said pawl carrying structure including means fixed against radial movement and adapted to guide said pawl during its said movement, yielding means acting in opposition to said centrifugal force for urging said pawl to its non-clutching position, and adjustable means acting on said yielding means and accessible for adjustment from without the clutch assembly for varying the clutching characteristics of said pawl.

12. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, yielding means engaging said pawl and acting in opposition to said centrifugal force for urging said pawl to its non-clutching position, and adjustable means acting on said yielding means for varying the clutching characteristics of said pawl, said adjustable means being accessible for actuation exteriorly of said structures.

13. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, yielding means engaging said pawl and acting in opposition to said centrifugal force for urging said pawl to its non-clutching position, and adjustable means including an adjusting member carried by said pawl carrying structure and disposed in circumferentially spaced relation with respect to said pawl for acting on said yielding means for varying the clutching characteristics of said pawl, said adjusting member being accessible for actuation exteriorly of the pawl receiving structure.

14. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and having an opening adapted to receive said pawl to provide a positive driving connection between said structures, yielding means engaging said pawl and acting in opposition to said centrifugal force for urging said pawl to its non-clutching position, and adjustable means including an adjusting member carried by said pawl carrying structure, said adjusting member being radially registered with said opening during relative rotation of said structures for rendering said adjusting member accessible for actuation exteriorly of said pawl receiving structure.

15. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and having an opening adapted to receive said pawl to provide a positive driving connection between said structures, yielding means engaging said pawl and acting in opposition to said centrifugal force for urging said pawl to its non-clutching position, and adjusting means including an adjusting member carried by said pawl carrying structure, said adjusting member being disposed in circumferentially spaced relation relative to said pawl, said adjusting member being radially registered with said opening during relative rotation of said structures for rendering said adjusting member accessible for actuation exteriorly of said pawl receiving structure.

16. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, yielding means engaging said pawl and acting in opposition to said centrifugal force for urging said pawl to its non-clutching position, and adjustable means acting on said yielding means for varying the clutching characteristics of said pawl, and locking means for said adjustable means, said adjustable means and said locking means being accessible for actuation exteriorly of said structures.

17. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and having an opening adapted to receive said pawl to provide a positive driving connection between said structures, a spring engaging said pawl and acting in opposition to said centrifugal force for urging said pawl to its non-clutching position, said spring having a portion thereof extending from said pawl in a direction generally transverse to the direction of said pawl movement, an adjustable abutment member carried by said pawl carrying structure and disposed in circumferentially spaced relation with respect to said pawl to provide an adjustable abutment for said extending spring portion, said abutment member being radially registered with said opening during relative rotation of said structures for rendering said adjusting member accessible for actuation exteriorly of said pawl receiving structure.

18. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, said pawl having a spring-receiving portion, a spring having a portion thereof coiled about said spring-receiving pawl portion and acting in opposition to said centrifugal force for urging said pawl to its non-clutching position, said spring having a second portion thereof extending from said pawl in a direction generally transverse to the direction of said pawl movement, and an abutment for said extending spring portion, said abutment being carried by said pawl carrying structure and located in circumferentially spaced relation with respect to said pawl.

19. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, said pawl carrying structure having a slideway opening outwardly of the pawl carrying structure for slidably guiding said pawl during said movement thereof, said pawl carrying structure having a bore opening outwardly of said pawl carrying structure, said bore being substantially spaced circumferentially of said pawl carrying structure from said guideway, a spring abutment member having at least a portion thereof disposed in said bore and extending inwardly of the pawl carrying structure, and a spring engaging said abutment and said pawl and acting in opposition to said centrifugal force for urging said pawl to its non-clutching position.

20. In a clutch for drivingly connecting driving and driven coaxial rotatable members, a pawl carrying structure fixed against radial displacement and drivingly connected to one of said members, a pawl receiving structure drivingly connected to the other of said members, a pawl carried by said pawl carrying structure and having a clutching portion adapted for clutching movement by centrifugal force exerted thereon in response to rotation of said pawl carrying structure, said pawl carrying structure having a guideway extending outwardly from said common axis of rotation for slidably receiving said pawl clutching portion, said guideway having circumferentially spaced walls at least one of which is slidably engaged by said pawl clutching portion, means carried by said pawl receiving structure for receiving said pawl clutching portion to drivingly connect said members when said structures are free from driving connection and are operated at substantially the same speed of rotation, means including a spring acting on said pawl in opposition to said centrifugal force, said spring being disposed for yielding action between said pawl and an abutment rotatable with said pawl carrying structure, said spring abutment being disposed at a point spaced circumferentially from said pawl clutching portion outside of the space between the walls of said guideway, said spring being constructed and arranged to progressively increase its opposing force substantially in direct proportion to the progressively increasing centrifugal force acting on said pawl at successive positions in the clutching movement of said pawl clutching portion at the minimum speed of rotation of said pawl carrying structure sufficient to cause said pawl clutching movement, and means for adjusting said abutment to vary the clutching movement of said pawl.

21. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, said pawl having a spring-receiving portion, a spring having a portion thereof coiled about said spring-receiving pawl portion and acting in opposition to said centrifugal force for urging said pawl to its non-clutching position, said spring having second portions thereof extending from said pawl in opposite directions generally transverse to the direction of said pawl movement, and abutment means for said extending spring portions.

22. In a clutch for drivingly connecting driving and driven coaxial rotatable members, a pawl carrying structure fixed against radial displacement and drivingly connected to one of said members for rotation about the common axis of rotation of said members, a pawl receiving structure drivingly connected to the other of said members for rotation about said axis, said pawl carrying structure having a slideway formed with circumferentially spaced walls extending in a direction outwardly from said axis toward said pawl receiving structure, a pawl carried by said pawl carrying structure and having a clutching portion disposed to one side of said axis for outward sliding movement in said guideway, said pawl clutching portion having at least one side face thereof in sliding engagement with an outwardly extending wall of said slideway, said pawl clutching portion being adapted for clutching movement by centrifugal force exerted thereon in response to rotation of said pawl carrying structure substantially at or above a predetermined critical speed of rotation of said pawl carrying structure, means carried by said pawl receiving structure for receiving said pawl clutching portion to drivingly connect said members when said structures are free from driving connection therebetween and are operated at substantially the same speed of rotation, and a pawl retracting spring rotatably carried with said pawl carrying structure and acting on said pawl in opposition to said centrifugal force, said spring being adapted to effect inward sliding movement of said pawl, said spring having its end portions disposed at points respectively spaced circumferentially of said pawl clutching portion outside of the space between the walls of said guideway.

23. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and having an opening adapted to receive said pawl to provide a positive driving connection between said structures, yielding means disposed to act on said pawl to effect retracting movement thereof in opposition to centrifugal force movement thereof, and adjusting means including an adjusting member carried by said pawl carrying structure, said adjusting member being disposed in circumferentially spaced relation relative to said pawl, said adjusting member being radially registered with said opening during relative rotation of said structures for rendering said adjusting member accessible for actuation exteriorly of said pawl receiving structure.

24. In a centrifugally operated clutch, in combination, a driving and a driven member, one of said members having a radially extending recess therein, a dog operating in said recess and moved to its projected position under the influence of centrifugal force, said recessed member having a spring-receiving cavity opening inwardly of said recessed member and extending generally transversely of said recess, a coiled spring engaging said dog to retract the same, said spring having a portion thereof arranged in said cavity, said spring portion having an end thereof bearing on a bounding portion of said cavity for anchoring said spring.

25. In a centrifugally operated clutch, in combination, a driving and a driven member, one of said members having a recess therein, a dog radially slidable in said recess under the action of centrifugal force, a retraction spring for said dog comprising a coiled spring arranged with the axis of the coils parallel to the axis of said recessed member, said dog having a cavity opening inwardly of said recessed member, said spring having a portion thereof disposed in said cavity and engaging said dog, said spring having an end thereof anchored at least in one direction to said recessed member.

26. In a centrifugally operated clutch, in combination, a driving and a driven member, one of said members having a recess therein, a dog radially slidable in said recess under the action of centrifugal force, a retracting spring for said dog comprising a coiled spring arranged with the axis of the coils parallel to the axis of said recessed member, said dog having a cavity, said spring having a portion thereof disposed in said cavity and engaging said dog, said spring having an end thereof anchored at least in one direction to said recessed member, and means for moving said end of the spring to vary the tension thereof.

27. An automatic clutch for establishing driving relation between a pair of shafts comprising, a ring member having openings therein, a core member having a notch extending from face to face of said member and radially inwardly from the outer periphery thereof, and a radially movable dog mounted in said notch and adapted to be moved under the action of centrifugal force into engagement with the recesses in said ring member, said core member having an annular groove therein and a restraining spring mounted in said annular groove and engaging said dog to retract the same from engaging position.

28. In a clutch for drivingly connecting driving and driven members, a pawl carrying structure drivingly connected to one of said members, a pawl carried by said pawl carrying structure and adapted for clutching movement by centrifugal force acting thereon in response to rotation of the pawl carrying structure, a pawl receiving structure drivingly connected to the other of said members and adapted to receive said pawl to provide a positive driving connection between said structures, said pawl and said pawl carrying structure each having a spring engaging portion thereof, said spring engaging portions being circumferentially spaced from each other, a spring having a portion thereof coiled for engagement with one of said spring engaging portions, said spring having a second portion thereof extending from said coiled portion generally circumferentially for engagement with the other of said spring engaging portions, said spring acting in opposition to said centrifugal force for urging said pawl to its non-clutching position, and means accommodating adjusting displacement of one of said spring portions relative to the other for varying the operating characteristics of said pawl.

EDWIN R. MAURER.

CERTIFICATE OF CORRECTION.

Patent No. 2,179,945.　　　　　　　　　　　　　　November 14, 1939.

EDWIN R. MAURER.

It is hereby certified that error appears in the printed specification of the above numbered patent requiring correction as follows: Page 5, first column, line 71, claim 6, strike out the words "clutching portion" and insert the same after "pawl" in line 70, same claim; and that the said Letters Patent should be read with this correction therein that the same may conform to the record of the case in the Patent Office.

Signed and sealed this 4th day of June, A. D. 1940.

(Seal)　　　　　　　　　　　　　　　　　　　　　　Henry Van Arsdale,
　　　　　　　　　　　　　　　　　　　　　Acting Commissioner of Patents.